(12) United States Patent
Bromand et al.

(10) Patent No.: US 12,361,928 B2
(45) Date of Patent: Jul. 15, 2025

(54) VARIABLE WAKE WORD DETECTORS

(71) Applicant: Spotify AB, Stockholm (SE)

(72) Inventors: Daniel Bromand, Boston, MA (US); Björn Erik Roth, Stockholm (SE)

(73) Assignee: Spotify AB, Stockholm (SE)

( * ) Notice: Subject to any disclaimer, the term of this patent is extended or adjusted under 35 U.S.C. 154(b) by 598 days.

(21) Appl. No.: 17/585,223

(22) Filed: Jan. 26, 2022

(65) Prior Publication Data

US 2023/0237992 A1    Jul. 27, 2023

(51) Int. Cl.
*G10L 15/18* (2013.01)
*G10L 15/08* (2006.01)
*G10L 15/20* (2006.01)
*G10L 15/22* (2006.01)
*G10L 15/30* (2013.01)

(52) U.S. Cl.
CPC .............. *G10L 15/08* (2013.01); *G10L 15/20* (2013.01); *G10L 15/22* (2013.01); *G10L 2015/088* (2013.01); *G10L 2015/223* (2013.01)

(58) Field of Classification Search
CPC .............. G10L 15/22; G10L 2015/088; G10L 2015/223; G10L 21/0208; G10L 25/78; G10L 25/84; G10L 15/28; G10L 15/32; G10L 15/05
See application file for complete search history.

(56) References Cited

U.S. PATENT DOCUMENTS

| | | | |
|---|---|---|---|
| 10,186,265 B1 | 1/2019 | Lockhart et al. | |
| 10,733,990 B2* | 8/2020 | Zurek | G10L 15/08 |
| 10,908,873 B2* | 2/2021 | Gosu | G06F 3/165 |
| 11,100,930 B1 | 8/2021 | Salem et al. | |
| 12,001,260 B1* | 6/2024 | Chemudugunta | G10L 15/22 |
| 2019/0043492 A1 | 2/2019 | Lang | |
| 2019/0051297 A1* | 2/2019 | Knudson | G10L 15/22 |
| 2019/0115018 A1* | 4/2019 | Zurek | H04R 3/005 |
| 2019/0115019 A1* | 4/2019 | Zurek | G10L 15/22 |
| 2019/0295540 A1* | 9/2019 | Grima | G10L 15/22 |

(Continued)

OTHER PUBLICATIONS

Amazon, "Enable wake word verification", located online at the wayback machine internet archive: https://developer.amazon.com/en-us/docs/alexa/alexa-voice-service/enable-cloud-based-wake-word-verification.html, dated Aug. 5, 2020, 2 pages.

*Primary Examiner* — Olujimi A Adesanya
(74) *Attorney, Agent, or Firm* — McDonnell Boehnen Hulbert & Berghoff LLP

(57) ABSTRACT

A second wake word detector, at a media-playback device, that plays audio (or other) content to a device, such as a voice-enabled device, detects false wake words in the audio content. The second wake word detector analyzes the audio stream to determine if the audio stream contains any audio that sounds like the wake word. If so, the second wake word detector can generate one of a plurality of instructions that describes the time period, within the audio content, in which the false wake word was encountered. The instruction can cause a first wake word detector to assume one of a plurality of configurations. The media-playback device can then instruct or inform the voice-enabled device of the presence of the false wake word. In this way, the wake word detector, at the voice-enabled device, is not activated to receive the false wake word or ignores the wake word.

20 Claims, 7 Drawing Sheets

(56) References Cited

U.S. PATENT DOCUMENTS

| | | | | |
|---|---|---|---|---|
| 2019/0311719 A1* | 10/2019 | Adams | ............ | G10L 15/30 |
| 2019/0325870 A1* | 10/2019 | Mitic | ............ | G10L 15/22 |
| 2020/0066258 A1 | 2/2020 | Meyers et al. | | |
| 2020/0090646 A1* | 3/2020 | Smith | ............ | G10L 15/30 |
| 2020/0090647 A1* | 3/2020 | Kurtz | ............ | G06F 3/167 |
| 2020/0118558 A1* | 4/2020 | Wightman | ............ | G10L 15/10 |
| 2020/0125162 A1* | 4/2020 | D'Amato | ............ | H04R 29/005 |
| 2020/0135224 A1* | 4/2020 | Bromand | ............ | H04M 9/08 |
| 2020/0175989 A1* | 6/2020 | Lockhart | ............ | G10L 15/26 |
| 2020/0243103 A1* | 7/2020 | Gilson | ............ | G10L 15/22 |
| 2021/0035572 A1* | 2/2021 | D'Amato | ............ | G06F 3/167 |
| 2021/0065696 A1* | 3/2021 | Bromand | ............ | G06F 3/165 |
| 2021/0241759 A1* | 8/2021 | Yang | ............ | G06F 3/167 |
| 2021/0390948 A1* | 12/2021 | Shah | ............ | G10L 15/065 |
| 2021/0405962 A1* | 12/2021 | Mackay | ............ | H04N 21/8547 |
| 2022/0308975 A1* | 9/2022 | Zivkovic | ............ | G06N 20/00 |
| 2023/0063839 A1* | 3/2023 | Bromand | ............ | H04R 3/005 |
| 2024/0265921 A1* | 8/2024 | Dureau | ............ | G10L 15/22 |

* cited by examiner

VARIABLE WAKE WORD DETECTORS

BACKGROUND

The use of digital assistants has become prolific. To converse with these digital assistants or other machine interfaces, humans often have to speak into a device to provide a command. The digital assistants can then provide an output, which is often synthesized speech that is audibly presented from a speaker attached to the device. While communicating with machine interfaces is often straightforward, the digital assistant can sometimes respond to sounds in the environment that were not meant to be commands for the digital assistant.

SUMMARY

In general terms, this disclosure is directed to speech processing. In some embodiments, and by non-limiting example, the speech processing includes variable false wake word detectors.

One aspect is a method comprising: determining a playback delay at a voice-enabled device; comparing the playback delay to a threshold; when the playback delay is less than the threshold, configuring the voice-enabled device with a first wake word configuration; and when the playback delay is more than the threshold, configuring the voice-enabled device with a second wake word configuration.

Another aspect is a media-playback device comprising: a memory; a processor, in communication with the memory, that causes the media-playback device to: determine a parameter associated with a voice-enabled device; compare the parameter to a threshold; when the parameter is less than the threshold, configure the voice-enabled device with a first wake word configuration; and when the parameter is more than the threshold, configure the voice-enabled device with a second wake word configuration.

A further aspect is a method comprising: determining a parameter associated with a media-playback device; comparing the parameter to a threshold; when the parameter is less than the threshold, configuring the media-playback device with a first wake word configuration; and when the parameter is more than the threshold, configuring the media-playback device with a second wake word configuration.

BRIEF DESCRIPTION OF THE FIGURES

The accompanying drawings, which are incorporated in and constitute a part of this disclosure, illustrate various example of the present disclosure. In the drawings.

DETAILED DESCRIPTION

Figure 1:
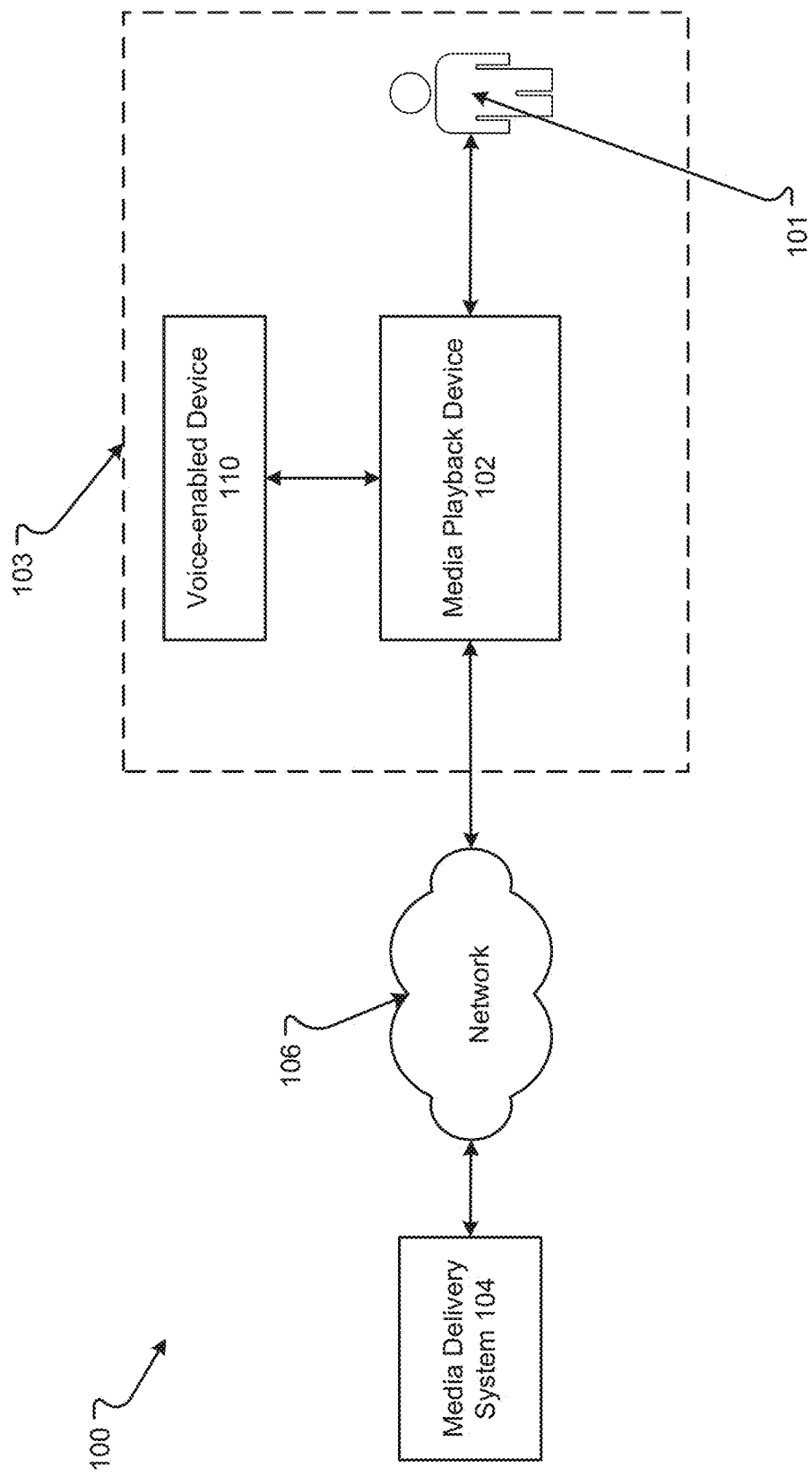
FIG. 1 is a block diagram of an environment for receiving speech input or providing speech output in accordance with aspects of the present disclosure.

The following examples are explanatory only, and should not be considered to restrict the disclosure's scope, as described and claimed. Furthermore, features and/or variations may be provided in addition to those described. For example, example(s) of the disclosure may be directed to various feature combinations and sub-combinations described in the example(s).

The following detailed description refers to the accompanying drawings. Wherever possible, the same reference numbers are used in the drawings and the following description to refer to the same or similar elements. If a numeral is provided with an appended letter, these identifiers refer to different instances of a similar or same component. While example(s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The description herein relates to voice-enabled computer systems (or virtual assistants) that can receive voice commands from a user. In addition, the description relates to a system that provides content to the user. For example, the content may be media content (such as music).

Wake words (WWs) are often used to awaken a dormant voice-enabled computer system (or virtual assistant) and cause the systems/assistants to listen for a command. For example, with Spotify, the wake word/phrase, "Hey Spotify," can be used to activate a Spotify-enabled device, and the wake word/phrase can be followed by a command, for example, "play Discover Weekly." Upon receipt of the command, a content delivery network (e.g., a Spotify server) can provide an audio stream to the voice-enabled device, to cause the device to begin playing media content (e.g., a discover weekly playlist).

The WW is helpful for privacy reasons because the device need only listen for the wake word/phrase. Also, the wake word/phrase can also prevent the device from inadvertently activating and executing a command when someone says a phrase that could be misinterpreted as a command (e.g., if someone says "play discover weekly" without saying the wake word/phrase first). Many voice-enabled devices can also play audio content. So, for example, a Spotify-enabled device that can respond to voice commands, can often also play Spotify content. Still further, many voice-enabled devices are used within the same physical space as devices that play audio content and can receive or "hear" audio from those devices that play audio.

Unfortunately, some current voice-enabled devices can sometimes incorrectly activate in response to something that is near-phrase, e.g., sounds like a WW, but is actually in the content being played by the voice-enabled device or another device. As one particular example, Spotify contains a variety of original content called "Spotify Originals." When the voice-enabled device plays that content, the content may include an audible announcement to the user that content is, "A Spotify Original." The phrase "A Spotify" sounds like "Hey Spotify," and this phrase can sometimes cause the wake word detector to incorrectly detect the "Hey Spotify" wake word by listening to the very content that the voice-enabled device is playing. The device may then stop the content or lower the volume of the content to start listening for a command. This pause or change in the content can annoy the listener. It is also possible that the false WW can awaken a silent device that can begin playing content unintentionally, which can interrupt and exacerbate the user.

The configurations and implementations herein may address the issues above by providing variable types of wake word (WW) detector configurations depending on one or more parameters, e.g., an amount of playback delay in the playback of the in-coming audio signal. A first WW configuration can disable or deactivate the WW detector based on a first state of one or more parameters, e.g., if the playback delay is longer. When the one or more parameters is in a second state, e.g., the delay is shorter, a second WW configuration can instruct a WW detector to ignore detected false wake words.

The configurations can include a first WW detector and a second WW detector. The second wake word detector monitors the audio stream coming in from the content delivery network (e.g., the Spotify content, such as music or a podcast, that is going to be played by the Spotify-enabled device) to determine if the audio stream contains any audio that sounds like the wake word (e.g., "hey Spotify"). If so, the second wake word detector sends a signal to the first (primary) wake word detector, which is monitoring audio from the microphones, and deactivates the first wake word detector for a period of time or instructs the first WW detector to ignore the detected false wake word. In this way, the first wake word detector is not activated or triggered even if the voice-enabled device plays the wake word or another phrase that sounds like the wake word.

An environment 100 for receiving or providing speech input and/or speech or media output may be as shown in FIG. 1. The environment 100 can include a sound environment 103. The sound environment 103 can include the user 101, which may provide speech input to a user device, e.g., a media-playback device 102, and/or listen to media output. Further, the media-playback device 102 can provide the media and/or speech output to the user 101. The sound environment 103 can also include one or more voice-enabled devices 110.

Voice-enabled device(s) 110 can be any type of device that may be instructed or can be interacted with by voice commands, e.g., a mobile device. For example, the voice-enabled device 110 may have virtual digital assistants or other types of interactive software. Some examples of voice-enabled devices may be Google Assistant, Amazon Alexa, etc. The voice-enabled device 110 may be a function or a component of the media-playback device 102 or may be a physically separate device. In implementations, the media-playback device 102 may be a voice-enabled device 110, which can communicate over a Local Area Network (LAN) located at the sound environment 103, and is present in the sound environment 103.

Figure 2A:
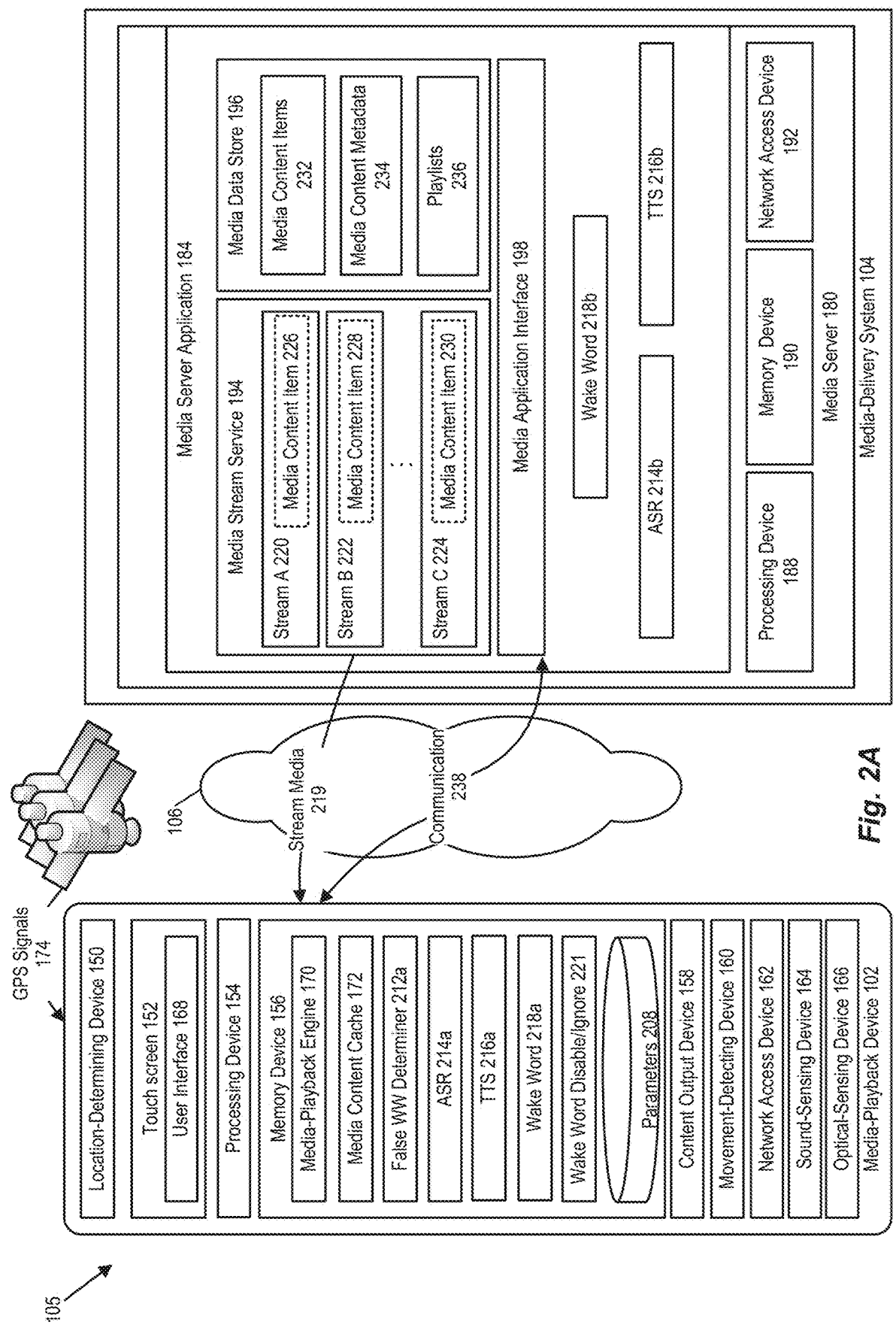
FIG. 2A is a block diagram of a media-playback device and a media-delivery system for receiving speech input or providing speech output in accordance with aspects of the present disclosure.
Figure 2B:
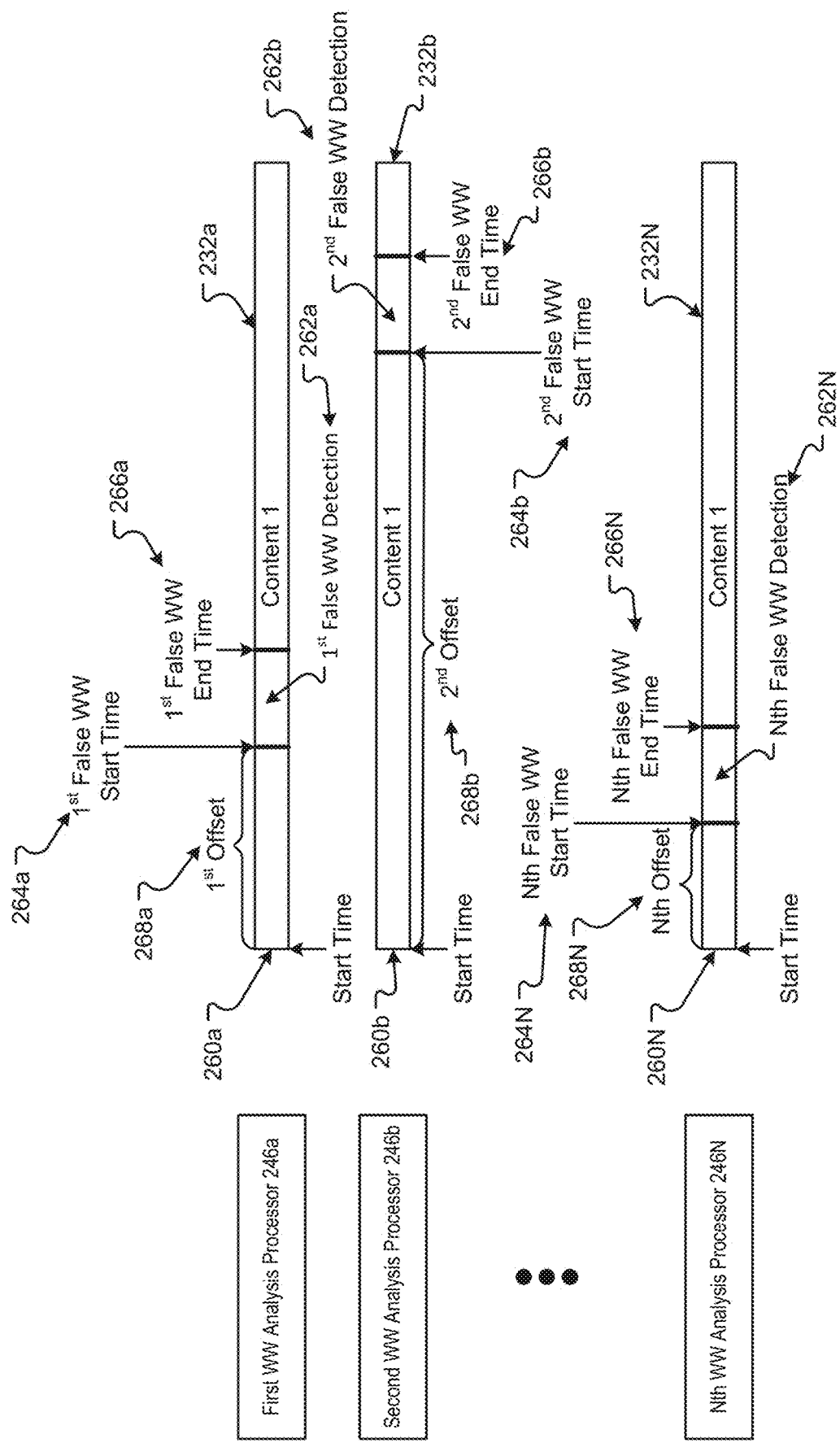
FIG. 2B is a block diagram showing a process of locating false wake words (WWs) with the media-playback device or the media-delivery system in accordance with aspects of the present disclosure.

FIGS. 2A and 2B illustrate implementations of an example system 105 for interaction with a user, for example, in the environment 100. For example, the system 105 can function for media content playback. The example system 105 includes a media-playback device 102 and a media-delivery system 104. The media-playback device 102 includes a media-playback engine 170. The system 105 communicates across a network 106.

The media-playback device 102 can play back media content items to produce media output or perform other actions, including, but not limited to, reading text (e.g., audio books, text messages, content from a network, for example, the Internet, etc.), ordering products or services, interacting with other computing systems or software, etc. The output from these various actions is considered media content. While in some implementations, media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, text, spoken media, etc., and portions or combinations thereof.

The media-playback device 102 plays media content for the user. The media content that is played back may be selected based on user input or may be selected without user input. The media content may be selected for playback without user input by either the media-playback device 102 or the media-delivery system 104. For example, media content can be selected for playback without user input based on stored user profile information, location, travel conditions, current events, and other criteria. User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Although the media-playback device 102 is shown as a separate device in FIG. 1, the media-playback device 102 can also be integrated with another device or system, e.g., a vehicle (e.g., as part of a dash-mounted vehicle infotainment system).

The media-playback engine 170 generates interfaces for selecting and playing back media content items. In at least some implementations, the media-playback engine 170 generates interfaces that are configured to be less distracting to a user and require less attention from the user than a standard interface. Implementations of the media-playback engine 170 are illustrated and described further throughout.

FIG. 2A are schematic illustrations of an example system 105 for media content playback. In FIGS. 1 and 2A, the media-playback device 102, the media-delivery system 104, and the network 106 are shown. Also shown are the user 101, the sound environment 103, and voice-enabled devices 110.

As noted above, the media-playback device 102 plays media content items. In some implementations, the media-playback device 102 plays media content items that are provided (e.g., streamed, transmitted, etc.) by a system external to the media-playback device 102, for example, the media-delivery system 104, another system, or a peer device. Alternatively, in some implementations, the media-playback device 102 plays media content items stored locally on the media-playback device 102. Further, in at least some implementations, the media-playback device 102 plays media content items that are stored locally and media content items provided by other systems.

In some implementations, the media-playback device 102 is a computing device, a mobile device, handheld entertainment device, smartphone, tablet, watch, wearable device, or any other type of device capable of playing media content. In yet other implementations, the media-playback device 102 is an in-dash vehicle computer, laptop computer, desktop computer, television, gaming console, set-top box, network appliance, blue-ray or DVD player, media player, stereo, radio, smart home device, digital assistant device, etc.

In at least some implementations, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other implementations may include additional, different, or fewer components. For example, some implementations do not include one or more of the location-determining device 150, the touch screen 152, the sound-sensing device 164, and the optical-sensing device 166.

The location-determining device 150 is a device that determines the location of the media-playback device 102. In some implementations, the location-determining device 150 uses one or more of the following technologies: Global Positioning System (GPS) technology which may receive GPS signals 174 from satellites, cellular triangulation technology, network-based location identification technology, Wi-Fi positioning systems technology, and combinations thereof.

The touch screen 152 operates to receive an input from a selector (e.g., a finger, stylus, etc.) controlled by the user 101. In some implementations, the touch screen 152 operates as both a display device and a user input device. In some implementations, the touch screen 152 detects inputs based on one or both of touches and near-touches. In some implementations, the touch screen 152 displays a user interface 168 for interacting with the media-playback device 102. As noted above, some implementations do not include a touch screen 152. Some implementations include a display device and one or more separate user interface devices. Further, some implementations do not include a display device.

In some implementations, the processing device 154 comprises one or more central processing units (CPU) or processors. In other implementations, the processing device 154 additionally or alternatively includes one or more digital signal processors (DSPs), field-programmable gate arrays (FPGAs), Application Specific Integrated Circuits (ASICs), system-on-chips (SOCs), or other electronic circuits.

The memory device 156 operates to store data and instructions. In some implementations, the memory device 156 stores instructions for a media-playback engine 170 and includes the media-playback engine 170. In some implementations, the media-playback engine 170 selects and plays back media content and generates interfaces for selecting and playing back media content items. As described above, the media-playback engine 170 also generates interfaces for selecting and playing back media content items.

In at least some implementations, the media-playback engine 170 generates interfaces that are configured to be less distracting to a user and require less attention from the user than other interfaces generated by the media-playback engine 170. For example, interface(s) generated by the media-playback engine 170 may include fewer features than the other interfaces generated by the media-playback engine 170. These interfaces generated by the media-playback engine 170 may make it easier for the user to interact with the media-playback device 102 during travel or other activities that require the user's attention.

Some implementations of the memory device also include a media content cache 172. The media content cache 172 stores media content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media content items such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like for which a user may wish to resume playback), the presence of false WWs, etc.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, Random Access Memory (RAM), Read Only Memory (ROM), Electrically Erasable Programmable Read Only Memory (EEPROM), flash memory and other memory technology, Compact Disc-Read Only Memory (CD-ROM), blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some implementations, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some implementations, the content output device 158 generates media output for the user 101 that is directed into a sound environment 103, for example, an interior cabin of the vehicle. Examples of the content output device 158 include a speaker assembly comprising one or more speakers, an audio output jack, a BLUETOOTH® transmitter, a display panel, and a video output jack. Other implementations are possible as well. For example, the content output device 158 may transmit a signal through the audio output jack or BLUETOOTH® transmitter that can be used to reproduce an audio signal by a connected or paired device such as headphones, speaker system, vehicle head unit, etc.

The movement-detecting device 160 senses movement of the media-playback device 102. In some implementations, the movement-detecting device 160 also determines an orientation of the media-playback device 102. In at least some implementations, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret those acceleration as indicating movement of the media-playback device 102 too.

The network access device 162 operates to communicate with other computing devices over one or more networks, such as the network 106. Examples of the network access device include one or more wired network interfaces and wireless network interfaces. Examples of wireless network interfaces include infrared, BLUETOOTH® wireless technology, 802.11 a/b/g/n/ac/x/ay/ba/be, and cellular or other radio frequency interfaces.

The network 106 is an electronic communication network that facilitates communication between the media-playback device 102, the media-delivery system 104, or other devices or systems. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various implementations, the network 106 includes various types of links. For example, the network 106 can include wired and/or wireless links, including BLUETOOTH®, Ultra-WideBand (UWB), 802.11, ZIGBEE®, cellular, and other types of wireless links. Furthermore, in various implementations, the network 106 is implemented at various scales. For example, the network 106 can be implemented as one or more vehicle are networks, Local Area Networks (LANs), metropolitan area networks, subnets, Wide Area Networks (WANs) (such as the World Wide Web (WWW) and/or the Internet) or can be implemented at another scale. Further, in some implementations, the network 106 includes multiple networks, which may be of the same type or of multiple different types.

The sound-sensing device 164 senses sounds proximate to the media-playback device 102 (e.g., sounds within a vehicle in which the media-playback device 102 is located). In some implementations, the sound-sensing device 164 comprises one or more microphones. For example, the sound-sensing device 164 may capture a recording of sounds from proximate the media-playback device 102. These recordings may be analyzed by the media-playback device 102 using speech-recognition technology, e.g., the Automatic Speech Recognition (ASR) 214a, 214b, to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words.

Additionally or alternatively, the sound-sensing device 164 may determine various sound properties about the sounds proximate the user such as volume, dominant frequency or frequencies, duration of sounds, pitch, etc. These sound properties may be used to make inferences about the sound environment 103 proximate to the media-playback device 102, such as the amount or type of background noise in the sound environment 103, whether the sensed sounds are likely to correspond to a private vehicle, public transportation, etc., or other evaluations or analyzes. In some implementations, recordings captured by the sound-sensing device 164 are transmitted to the media-delivery system 104 (or another external server) for analysis using speech-recognition and/or intent-recognition technologies.

The optical-sensing device 166 senses optical signals proximate the media-playback device 102. In some implementations, the optical-sensing device 166 comprises one or more light sensors or cameras. For example, the optical-sensing device 166 may capture images or videos. The captured images can be processed (by the media-playback device 102 or an external server, for example, the media-delivery system 104 to which the images are transmitted) to detect gestures, which may then be interpreted as commands to change the playback of media content, or to determine or receive other information.

Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some implementations, other media-playback devices as well. The media-delivery system 104 can also include a media server 180. Although FIG. 2A shows a single media server 180, some implementations include multiple media servers. In these implementations, each of the multiple media servers may be identical or similar and may provide similar functionality (e.g., to provide greater capacity and redundancy, or to provide services from multiple geographic locations). Alternatively, in these implementations, some of the multiple media servers 180 may perform specialized functions to provide specialized services (e.g., services to enhance media content playback, to analyze spoken messages from the user 101, to synthesize speech, etc.). Various combinations thereof are possible as well.

The media server 180 transmits a media stream 219 to media-playback devices, such as the media-playback device 102. In some implementations, the media server 180 includes a media server application 184, a processing device 188, a memory device 190, and a network access device 192. The processing device 188, memory device 190, and network access device 192 may be similar to the processing device 154, memory device 156, and network access device 162 respectively, which have each been previously described.

In some implementations, the media server application 184 streams audio, video, or other forms of media content. The media server application 184 includes a media stream service 194, a media data store 196, and a media application interface 198. The media stream service 194 operates to buffer media content such as media content items 226, 228, and 230, for streaming to one or more streams 220, 222, and 224.

The media application interface 198 can receive requests or other communication from media-playback devices 102 or other systems, to retrieve media content items from the media server 180. For example, in FIG. 2A, the media application interface 198 receives communication 238 from the media-playback engine 170.

In some implementations, the media data store 196 stores media content items 232, media content metadata 234, and playlists 236. The media data store 196 may comprise one or more databases and file systems. As noted above, the media content items 232 may be audio, video, or any other type of media content, which may be stored in any format for storing media content.

The media content metadata 234 operates to provide various information associated with the media content items 232. In some implementations, the media content metadata 234 includes one or more of title, artist name, album name, length, genre, mood, era, the presence of false WWs, etc. The playlists 236 operate to identify one or more of the media content items 232 and. In some implementations, the playlists 236 identify a group of the media content items 232 in a particular order. In other implementations, the playlists 236 merely identify a group of the media content items 232 without specifying a particular order. Some, but not necessarily all, of the media content items 232 included in a particular one of the playlists 236 are associated with a common characteristic such as a common genre, mood, or era. The playlists 236 may include user-created playlists, which may be available to a particular user, a group of users, or to the public.

Each of the media-playback device 102 and the media-delivery system 104 can include additional physical computer or hardware resources. In at least some implementations, the media-playback device 102 communicates with the media-delivery system 104 via the network 106.

Although in FIG. 2A, only a single media-playback device 102 and media-delivery system 104 are shown, in accordance with some implementations, the media-delivery system 104 can support the simultaneous use of multiple media-playback devices, and the media-playback device 102 can simultaneously access media content from multiple media-delivery systems. Additionally, although FIG. 2A illustrate a streaming media based system for media playback during travel, other implementations are possible as well. For example, in some implementations, the media-playback device 102 is configured to select and playback media content items without accessing the media-delivery system 104. Further in some implementations, the media-playback device 102 operates to store previously streamed media content items in a local media data store (e.g., the media content cache 172).

In at least some implementations, the media-delivery system 104 can be used to stream, progressively download, or otherwise communicate music, other audio, video, or other forms of media content items to the media-playback device 102 for playback during travel on the media-playback device 102. In accordance with an implementation, a user 101 can direct the input 176 to the user interface 168 to issue requests, for example, to playback media content for playback during travel on the media-playback device 102.

Components that may be part of the media-playback device 102 and/or the media-delivery system 104 may be as shown in FIG. 2A. The components shown FIG. 2A can include one or more of, but are not limited to, a false WW determiner 212a, 212b, a wake word disable/ignore function 221, and/or a media data store 184a. The components shown in FIG. 2A may be provided to locate false WWs in media content, analyze one or more parameters associated with the device 102, the voice-enabled device 110, and/or the sound environment 103, and store and provide the instructions to the voice-enabled device 110. Portions of either the media-delivery system 104 or the media-playback device 102 may perform some or all of the functions described herein in conjunction with the components described herein.

Figure 3:
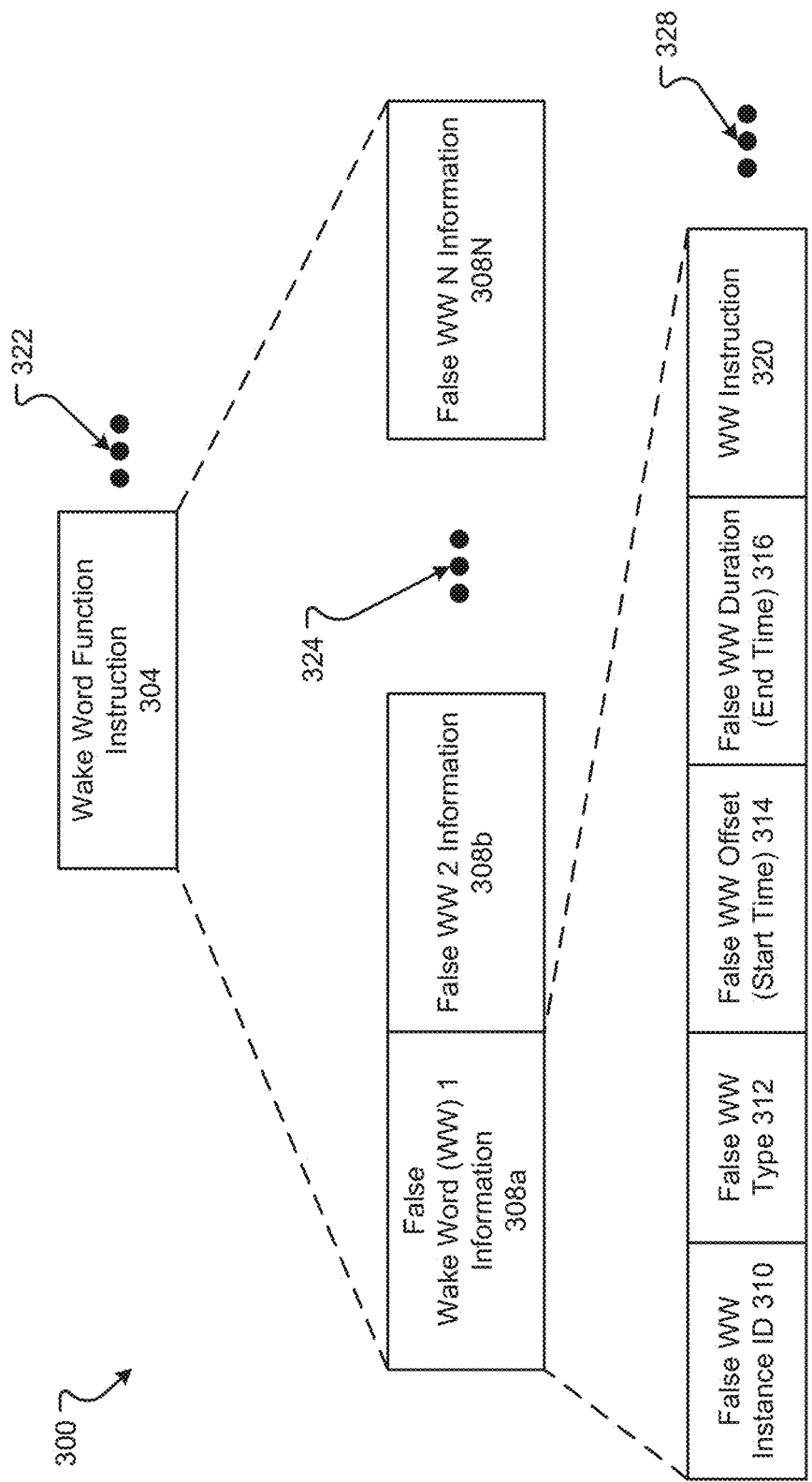
FIG. 3 is a block diagram of an instruction for a voice-enabled device in accordance with aspects of the present disclosure.

The false WW determiner 212, which can be a second wake word detector (or may be considered a portion of the second wake word detector with the wake word disable/ignore function 221) can analyze content within the media content items 226-230 sent via the media stream 219 to determine if one or more sound(s) may be one or more false WWs within an item of media content that may trigger a wake word detector 218 (also referred to as a first wake word detector). The wake word detector 218 can be configured to receive wake words from the user 101 by monitoring ambient sound or noise, which is received as an audio signal from a microphone or other input device. The false WW determiner 212 can analyze the media content for one or more types of sounds that are the same as wake word(s) or are similar to the wake word(s). Further, upon discovering a false WW, the false wake word determiner 212 can generate information about the wake word(s) to send to the wake word disable/ignore function 221, to generate an instruction to send to the wake word detector 218 and/or the voice-enabled device 110. An example of the information generated by the false WW determiner 212 may be as shown in FIG. 3.

Further, the false WW determiner 212 may be configurable. In implementations, the false WW determiner 212 may compare the "likeness," of a sound to the false WW, to a threshold. The threshold can be, for example, a confidence interval. In some implementations, the false WW determiner 212 can apply a lower comparison threshold to sounds that sound similar to the wake word. In other words, the sounds may be more dislike the wake word but still register as a false WW. Thus, the false WW determiner 212 may be more likely, when using the lower comparison threshold, of detecting all possible false WWs that may trigger the wake word detector 218.

In implementations, the false WW determiner 212 can be multithreaded. The false WW determiner 212 may execute one or more threads or instances to analyze media content item(s) 232 for wake words. In implementations, the false WW determiner 212 can have one or more threads that analyze the media content item(s) 226-230 for a particular WW. Thus, for each WW that may exist within the sound environment 103, for example, "Hey Siri," "Hey Google," "Hey Weather Man," "Alexa," etc., a different thread of the false WW determiner 212 may analyze the content for that false WW. Which WW threads are executed to analyze the content may be configurable. For example, if the types of voice-enabled devices 110 are known in the sound environment 103 (e.g., the sound environment 103 includes an Amazon Alexa, a Siri device, and a Weatherman device), then only those threads associated with those known devices may be executed to analyze the content 226-230. Further, some of the voice-enabled devices 110, in the sound environment 103, may also not be enabled. Threads associated with those devices, which are not enabled, may also be disabled or not executed. Further still, a user or other input may determine which threads are enabled and executed.

In additional or alternative configurations, the false WW determiner 212 may have two or more threads analyzing for the same WW but analyzing different portions of the media content item(s) 226-230. In this way, the analysis of the media content item(s) 226-230 may be completed more quickly by parsing the media content item(s) 226-230 into separate portions for analysis. Regardless, the false WW determiner 212 can analyze the content for multiple instances of the false WW(s).

The media-playback device 102 can also include a parameters database 208. The parameters database 208 can be any type of database (e.g., flat-file databases, relational database, etc.) for storing the parameter data and/or metadata associated with the media-playback device 102 and/or the sound environment 103. The parameters can include information provided by the user or other systems or devices that can manipulate how the media-playback device 102 will instruct the wake word detector 218 and/or the voice-enabled device 110 about the false WWs. An example of a parameter can be the time delay (also referred to as the latency or playback delay) between receiving the streamed media at the media-playback engine 170 to the output of the media from the content output device 158. This time delay can inform the wake word disable/ignore function 221 whether to instruct the wake word function 218 (or similar function at the voice-enabled devices 110) whether to disable the wake word function 218 (for longer delays) or have the wake word function 218 ignore false wake words (for shorter delays). This time delay may be variable. The wake word disable/ignore function 221 can determine which instruction to send based on the amount of time the wake word function 218 takes to reconfigure, which may be another parameter. A comparison of the time delay to a threshold amount of time (associated with the reconfiguration time) can inform the wake word disable/ignore function 221 of which instruction to send, e.g., if the playback time delay is longer than the reconfiguration time, the wake word function 218 can disable, and if the playback time delay is shorter than the reconfiguration time, the wake word function 218 can ignore false WWs.

The parameters database 208 can include other parameters, for example, whether the voice-enabled device 110 has the capability to disable the wake word function 218 or whether the wake word function 218 has the capability to ignore false WWs. If the wake word function 218 cannot be disabled, the wake word disable/ignore function 221 can instruct the wake word function 218 to ignore false WWs. The wake word disable/ignore function 221 can analyze the various parameters, and based on one or more of the parameters, choose which instructions to send to the wake word function 218.

The ASR 214 can recognize speech input from the user into the media-playback device 102. The speech may be provided in the sound environment 103. The ASR 214 may then analyze the speech to determine what was said. The ASR 214 can also be engaged based on false WWs. However, the ASR 214 may be prevented from activating by the false WWs during the time period when those false WWs are identified in the content. The ASR 214 can be instructed to deactivate, by the wake word disable/ignore function 221, during the time period in which the false WW is played or audible. In other configurations, the wake word disable/ignore function 221 can instruct the ASR 214 to ignore the false WWs that are received, during the time period in which the false WW is played or audible, rather than deactivate the ASR 214.

A Text-To-Speech (TTS) 216a, 216b function can change text-to-speech. Thus, any type of audio feedback from the media-playback device 102 to the user 101 may be changed by the TTS 216. These operations can include converting any inputs, such as text messages or emails being read by the media-playback device 102, but also administrative messages being spoken to the user 101.

The wake word function 218 can receive a wake word. To determine the wake word within a recording, the wake word function 218 can apply a data structure. This data structure can allow the wake word function 218 to better search for the wake word within the recordings of the sound environment 103. When a false WW is detected in media content by the false WW determiner 212, the wake word function 218 may be prevented from activating by the false WWs when those false WWs are identified, and the wake word function 218 is instructed to deactivate during the false WW or ignore the false WW by the wake word disable/ignore function 221.

An implementation of the determination of the false WW may be as shown in FIG. 2B. The false WW determiner 212 may create or generate several instances or threads (e.g., first instance 246a, a second instance 246b, etc.). In one implementation, a single media content item(s) 226-230 may be reviewed by several instances of the false WW determiner 212. Each of these instances may be looking for different types of WW(s). For example, a first thread (e.g., a first instance 246a) may be looking for the "Alexa" WW. In contrast, the third thread of the false WW determiner 212 may be evaluating the content for false wake words similar to "Hey Spotify." The false WW determiner 212 threads can also analyze different media content items 232 at the same time.

Each media content item(s) 226-230 has a start time 260. When evaluating the media content item(s) 232 for false wake words, the false WW determiner 212 can begin comparing portions of the media content item(s) 232 to audio signals that are similar to or represent a particular WW. Upon detecting a match between the portion of content item 232 and the audio signal representing the WW, and at a predetermined confidence interval, the false WW determiner 212 determines that a first false WW has been detected (in false WW detection(s) 262a-262c) and that the false WW begins at a start time 264a-264c and ends at time 266a-266c. Start time 264 and end time 266 can determine a time period for the false WW detection 262. The start time 264 may be represented by an offset 268a-268c from the start time 260 of the media content item(s) 232. In this way, the content characteristics can describe when the false WW may occur and when the false WW will end. The other instances 240 may evaluate different portions of the media content item(s) 232 or may identify different WWs. The other false WW determiner 212 can locate other false WW detections 262b, 262c at different offsets 268b, 268c, with different start times 264b, 264c and end times 266b, 266c. This information about offsets, start and end times, types of false WWs, etc. may be provided for storage as media content metadata 234 for the media content item(s) 226-230. The amount of offset 268 or start time 264 of the false WW detection 262 may also function as a parameter as to what type of instruction the wake word disable/ignore function 221 may send to the wake word function 218.

An implementation of a data structure, data store, or database 300, which may store one or more instructions associated with false WWs may be as shown in FIG. 3. Each different type of instruction may include a data structure 300. As there may be different types of instructions for different wake word detectors 218 and/or voice-enabled devices 110, there may be more or fewer data structures 300 than that shown in FIG. 3, as represented by ellipses 328. Each data structure 300 can include one or more of, but is not limited to one or more false wake word information items. Each data structure 300 can include more or fewer data portions or fields than those shown in FIG. 3, as represented by ellipses 322.

False WW information 308a-308N can include information that indicates a false WW that was detected, for example, as shown in FIG. 2B. Each different instance of false wake words that are detected within the media content item(s) 232 may be provided as a different set of false WW information, for example, 308b, 308N, and there may be more or fewer instances of the false WW information 308 than that shown in FIG. 3, as represented by ellipses 324. As explained previously, the false WW information 308 can include one or more of, but is not limited to: a false wake word instance identifier (ID) 310, a type of false wake word 312, a false wake word offset 314 (for the start time of the false wake word within the media content item(s) 232), an end time 316 for the instance of the false WW (or the duration of the false WW detection 262), and/or a WW instruction 320. The false WW information 308 can have more or fewer items of information than that shown in FIG. 3, as represented by ellipses 328.

The false WW instance ID 310 can include one or more of any types of identifiers. For example, the ID 310 can include an alphanumeric, numeric, a globally unique identifier (GUID), or other type of ID. The ID uniquely identifies this false wake word instance in the media content metadata 234. The false WW type 312 can represent an indication of the false wake word that was detected. For example, the false WW type can include an indication that the WW was for "Hey Google," "Hey Spotify," etc. Thus, each item of false WW information 308 can be associated with a different type of WW and can allow the media-playback device 102 to instruct two or more wake word detectors 218 and/or voice-enabled devices 110 of the existence of false wake words. Thus, any type of voice-enabled device 110, within the sound environment 103, may enjoy the benefit of having false wake words determined in the media content 226-230 and receiving instructions to prevent interacting with those false WWs.

The false WW offset (start time) 314 can be the time offset 268 from the start time 260 to the start time 264 of the false WW detection 262. The offset 268 may be represented as minutes, seconds, and/or time divisions less than a second. In other implementations, the false WW offset (start time) 314 is a time when the false WW will occur. This time can be a timer or other indication of a time, understood jointly by the media-playback device 102 and the voice-enabled device 110.

The false WW duration (end time) 316 is similar to the false WW offset (start time) 314 information but indicates a time 266 indicating the end of the false WW instance. This information 316 may be represented also by an offset from the start time 260 or by an offset from the start time 264 of the false WW detections 262. In this way, the beginning and end of the false WW detection 262 may be documented.

The WW instruction 320 can be any instruction sent to a wake word function 218 at the media-playback device 102 or a separate voice-enabled devices 110 about the false WW. There may be at least two different instructions sent to a wake word function 218. When a false WW is detected in media content by the false WW determiner 212, the wake word function 218 may be deactivated or prevented from activating by the false WWs when those false WWs are identified. Thus, a first instructions can instruct the wake word function 218 to deactivate during the false WW to not receive the false WW. In other implementations, the wake word disable/ignore function 221 can send an instruction to ignore the false WWs after receiving the false WWs.

Figure 4:
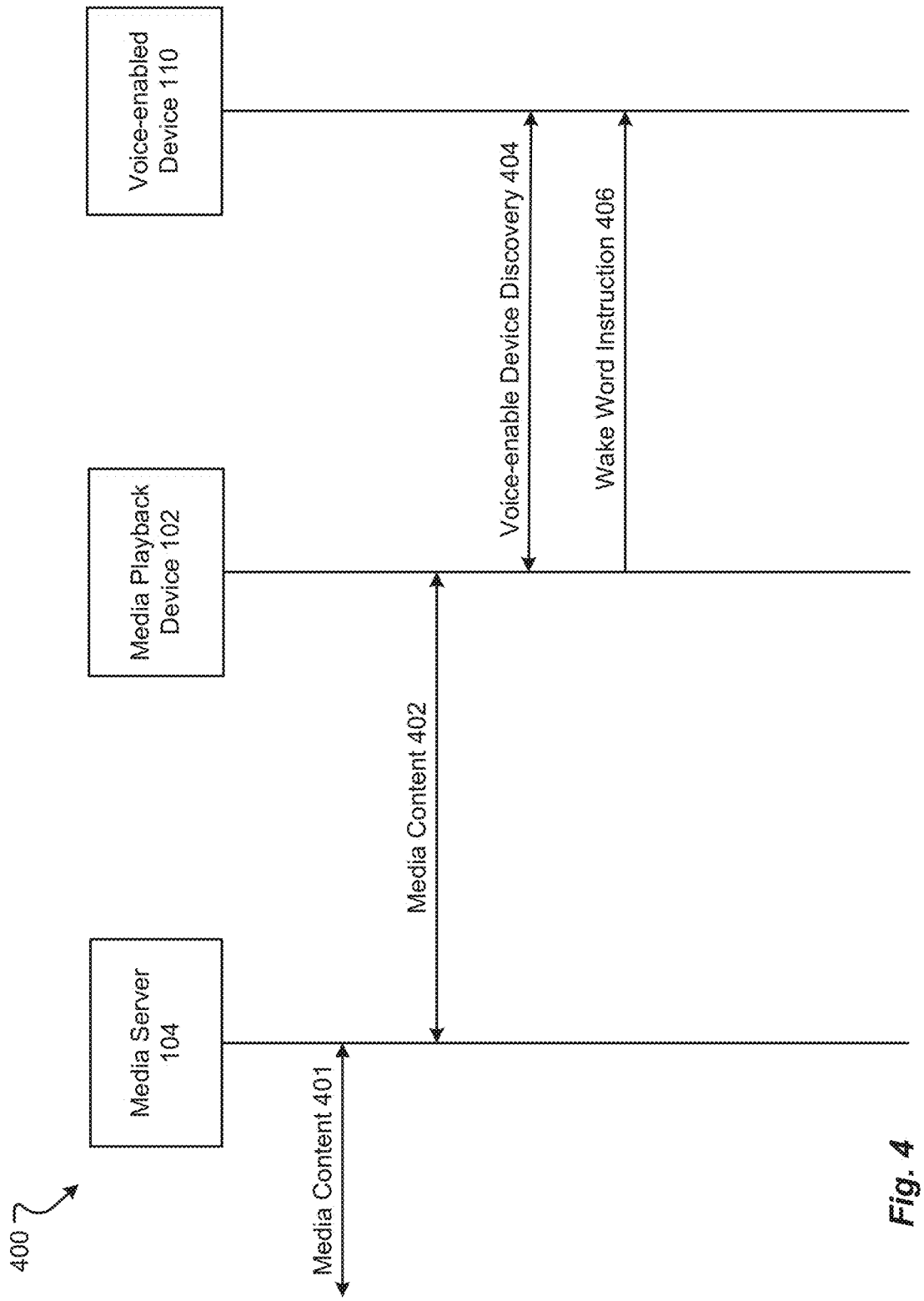
FIG. 4 is a signaling or signpost diagram of signals processed by the devices and systems herein in accordance with aspects of the present disclosure.

An embodiment of a signaling process 400 may be as shown in FIG. 4. The messages or communications may be sent between the media-playback device 102, a voice-enabled device 110, and the media-delivery system 104. The signals may be communicated over one or more networks 106 or directly between devices through wired or wireless connections. Further, the signals may be sent with any of the one or more communication methods, standards, processes, etc. as explained herein or as understood by one skilled in the art.

The media content signal 401 may represent the requests for and/or the input of media content 226-230. Media server 180 may request and/or receive various items of media content 226-230 on periodic and/or continual basis. The media content item(s) 226-230 may be provided in the content signal 401 and stored by the media server 180 in the media content database. Upon receiving new or changed media content items 232, the media server 180 can determine false WWs within that media content. Sometime thereinafter, the media-playback device 102 may request the media content from the media server 180.

Media content signal(s) 402 can include the media content 226-230 (with media content metadata 234) provided by the media server 180 and requested by the media-playback device 102. Media contact signal 402 can include the media content 226-230 but also the media content metadata 234 associated with the media content. Media-playback device 102 may then determine the different voice-enabled devices 110, within the sound environment 103, based on a voice-enabled device discovery signal(s) 404.

Voice-enabled device discovery 404 can include any handshake signals or other types of discovery processes used by the media-playback device 102 to determine various voice-enabled devices 110 within the sound environment 103. These different processes can include evaluating BLUETOOTH® or other wireless signals used to synchronize or associate different devices together. The signals 404 may occur before the media content 226-230 is received. Upon receiving the media content signal 402, the media-playback device 102 can begin to determine what instructions to send to various voice-enabled devices 110 to indicate the presence of possible false wake words.

Wake word instruction(s) 406 can be the instruction signal(s) from the media-playback device 102 to the voice-enabled device(s) 110 that can indicate the presence of a false WW that may be received by the voice-enabled device(s). This instruction can include a directive to deactivate the wake word function 218. In other implementations, the instruction can be a directive for the wake word function 218 to ignore false WWs for a predetermined period of time. The instructions can include the information in data structure 304, which may allow the wake word function 218 to determine when and for how long to deactivate or ignore false WWs. The wake word function 218 may be part of the media-playback device 102 or may be part of a voice-enabled device 110, which may be a different device that is physically separate from the media-playback device 102. Thus, the wake word instruction(s) 406 may be sent to the wake word function 218 of the media-playback device 102 and/or one or more other voice-enabled device(s) 110. The wake word instruction(s) 406 can be considered disable signals that may be transmitted through a wireless communication link to the voice-enabled device.

Figure 5:
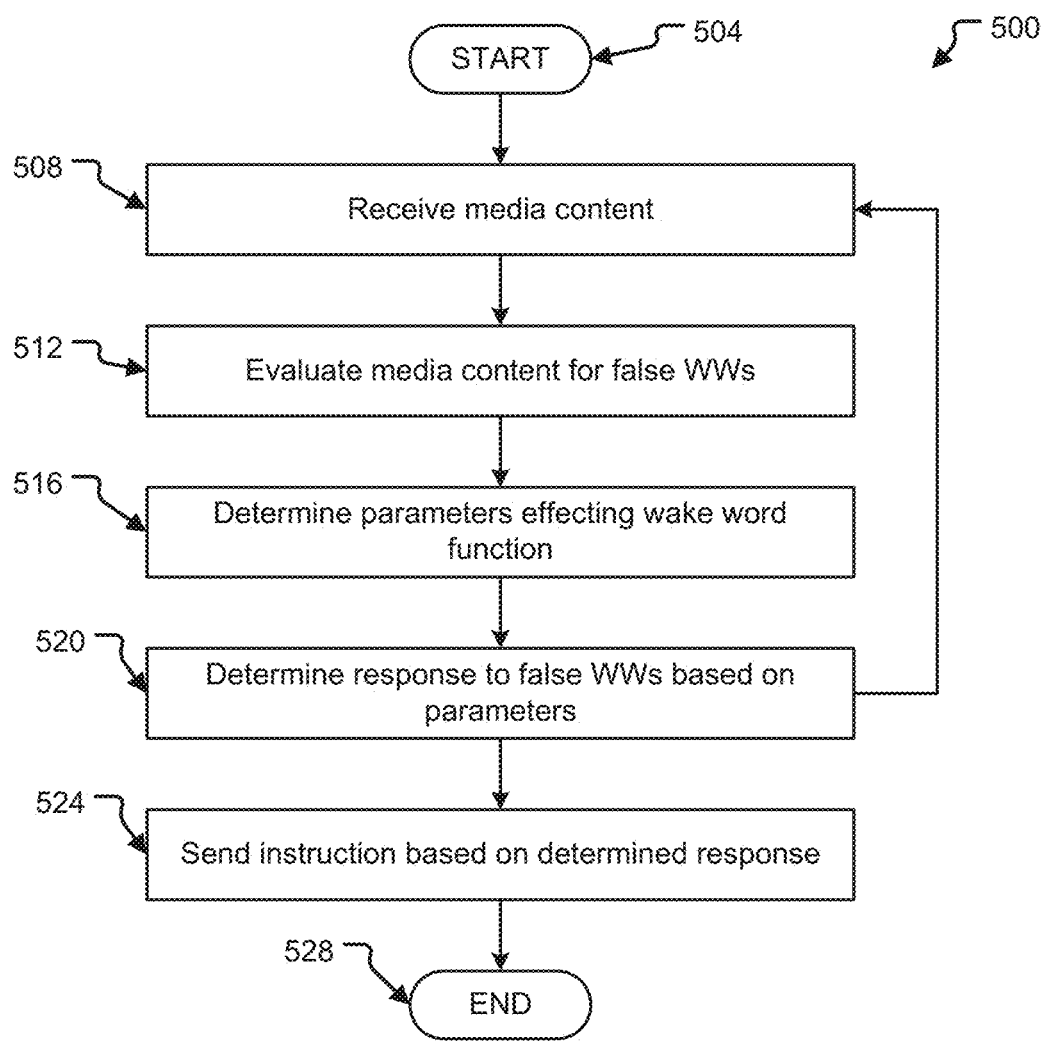
FIG. 5 is a method diagram of a method for instructing a voice-enabled device regarding false WWs in accordance with aspects of the present disclosure.

An implementation of a method 500 for creating an instruction about false WWs may be as shown in FIG. 5. The method 500 can start with a start operation 504 and can end with an end operation 528. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, a SOC, or other type of hardware device. Hereinafter, the method 500 shall be explained with reference to the systems, components, modules, software, data structures, etc. described herein.

The media-playback device 102 can receive media content, in stage 508, for example, from a media-delivery system 104. The media-playback device 102 can receive one or more media content item(s) 226-230, as media stream 219, from the media-delivery system 104. The media-playback engine 170 can begin playing the media stream 219 upon receiving the media content items 226-230. Contemporaneously with the first media stream 219 being received at the media-playback engine 170, the media stream 219 can be split into a second media stream and sent to the false WW determiner 212.

The media-playback device 102 may then evaluate media content 226-230 for false WWs, in stage 512. The false WW determiner 212 may then evaluate the media content item(s) 226-230 for the presence of false WWs. The false WW determiner 212 may create one or more of the analysis processor 246a-246N threads. The thread(s) 246 may evaluate the media content item(s) 226-230 for one or more types false wake words. The false wake words may be detected in a false wake word detection 262. Detection is determined when a portion of the media content item(s) 226-230 is similar to the sound signature of a WW. When there is a match, the false WW determiner 212 can indicate a location of the false WW by determining a false WW start time 264 and a false WW end time 266. These times 264, 266 may be indicated by an offset 268 from a start time 260 of the media content item(s) 226-230. This false WW information 308 may be provided to the wake word disable/ignore function 221.

Media-playback device 102 may then determine parameters effecting wake word function 218, in stage 516. The wake word disable/ignore function 221 can determine or receive one or more parameters (e.g., of the parameters database 208) associated with the one or more of, but not limited to, the media-playback device 102, the voice-enabled device 110, the sound environment 103, the wake word function 218, and/or the media-playback engine 170. As explained previously, the parameters can include information provided by the user or other systems or devices that can manipulate how the media-playback device 102 will instruct the wake word function 218 about the false WWs. An example of a parameter can be the playback time delay between receiving the streamed media at the media-playback engine 170 to the output of the media from the content output device 158. Another parameter can include, for example, whether the voice-enabled devices 110 are capable of disabling the wake word function 218 or whether the wake word function 218 can ignore false WWs. The wake word disable/ignore function 221 can compare the parameter to a threshold. For example, if the parameter is the playback time delay, the wake word disable/ignore function 221 can determine whether the playback time delay is more or less than the amount of time needed for the wake word function 218 to deactivate. When the parameter is less than the threshold, the wake word disable/ignore function 221 can configure the wake word function 218 of the media-playback device 102 or the voice-enabled device 110 into a first wake word configuration. For example, the wake word disable/ignore function 221 can instruct the wake word function 218 to ignore false WWs. When the parameter is more than the threshold, the wake word disable/ignore function 221 can configure the wake word function 218 of the media-playback device 102 or the voice-enabled device 110 into a second wake word configuration. For example, the wake word disable/ignore function 221 can deactivate the wake word function 218.

In another example, the wake word disable/ignore function 221 can compare the offset 268 of the false WW to the time needed to reconfigure the wake word function 218. If the false WW will happen before the wake word function 218 can be deactivated, the wake word disable/ignore function 221 can instruct the wake word function 218 to ignore the false wake word. Other parameters can be evaluated to determine which instruction to send. Based on the above comparisons and the false WW information, the wake word disable/ignore function 221 can determine which instruction to send with the false WW information, in stage 520. In implementations, the instruction may be an instruction to have the wake word function 218 deactivate for a predetermined period of time or an instruction to have the wake word function 218 ignore false WWs for a predetermined period of time.

The media-playback device 102 may then send the determined instruction to the wake word function 218 of the media-playback device 102 or the voice-enabled device 110, in stage 524. The wake word disable/ignore function 221 can send the instruction to the local wake word function 218 of the media-playback device 102 or to one or more voice-enabled device(s) 110. The instruction may be sent as signal 406 and include the information in data structure 304. Based on the instruction, the wake word function 218 can deactivate or ignore false WWs. Thus, the media-playback device 102 provides a process for providing false WW information and selectively, based on various parameters, determine how to address the presence of false WWs in the media content. In implementations, the wake word disable/ignore function 221 can also re-enable the wake word detector 218.

Figure 6:
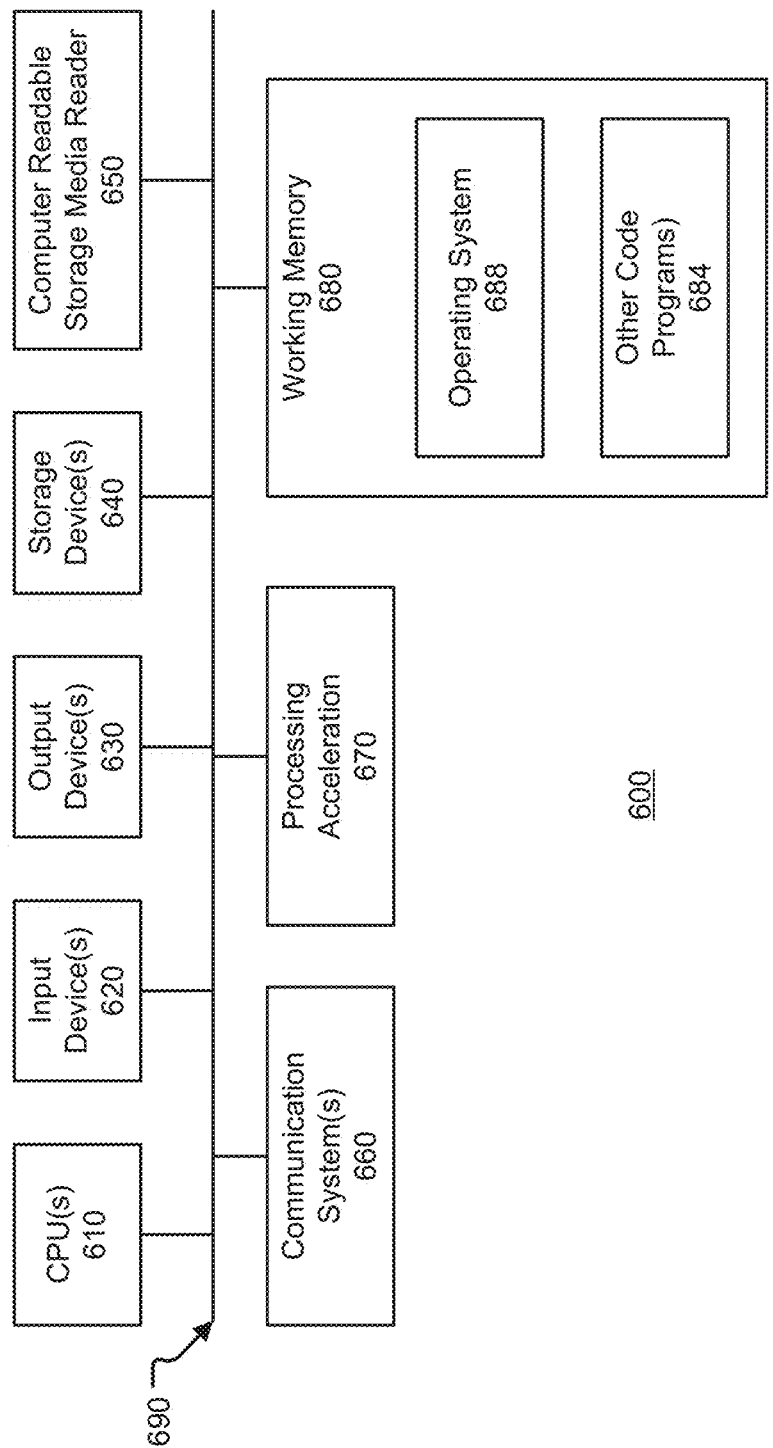
FIG. 6 is a block diagram of a computing system as may be deployed as one or more of the systems and/or devices described herein in accordance with aspects of the present disclosure.

FIG. 6 is a block diagram illustrating an exemplary computer system 600 in which embodiments of the present disclosure may be implemented. This example illustrates a computer system 600 such as may be used, in whole, in part, or with various modifications, to provide the functions of the disclosed system. For example, various functions may be controlled by the computer system 600, including, merely by way of example, generating, determining, identifying, receiving, etc.

The computer system 600 is shown comprising hardware elements that may be electrically coupled via a bus 690. The hardware elements may include one or more central processing units 610 (also referred to as processors), one or more input devices 620 (e.g., a mouse, a keyboard, etc.), and one or more output devices 630 (e.g., a display device, a printer, etc.). The computer system 600 may also include one or more non-transitory computer-readable media such as storage devices 640. By way of example, the storage device(s) 640 may be disk drives, optical storage devices, solid-state storage device such as a random-access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, BLUETOOTH®™ device, cellular communication device, etc.), and a working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with the storage device(s) 640) comprehensively representing remote, local, fixed, and/or removable storage devices plus storage media for temporarily and/or more permanently containing computer-readable information. The communications system 660 may permit data to be exchanged with a network, system, computer and/or another component described above.

The computer system 600 may also comprise software elements, shown as being currently located within the working memory 680, including an operating system 688 and/or other code 684. It should be appreciated that alternative embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of the computer system 600 may include code 684 for implementing any or all of the function of the various elements of the architecture as described herein. For example, software, stored on and/or executed by a computer system such as the system 600, can provide the functions of the disclosed system. Methods implementable by software on some of these components have been discussed above in more detail.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

While certain example of the disclosure have been described, another example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIGS. 1 and/or 2A may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
   determining a playback delay, at a media-playback device, between reception of content and output of the content from a speaker;
   comparing the playback delay to a threshold amount of time; and
   controlling configuration of a voice-enabled device, wherein the controlling is based on the comparing and includes (i) if the playback delay is less than the threshold amount of time, then, based on the playback delay being less than the threshold amount of time, configuring a wake-word detector of the voice-enabled device to monitor for presence of a wake word in ambient sound and, upon detecting the wake word, to ignore the detected wake word, and (ii) if the playback delay is more than the threshold amount of time, then, based on the playback delay being more than the threshold amount of time, configuring the wake-word detector of the voice-enabled device to not monitor for presence of the wake word in the ambient sound.

2. The method of claim 1, wherein configuring the wake-word detector of the voice-enabled device to ignore the detected wake word comprises configuring the wake-word detector of the voice-enabled device to not take action in response to detecting of the wake word.

3. The method of claim 1, wherein configuring the wake-word detector of the voice-enabled device to not monitor for presence of the wake word in the ambient sound comprises disabling wake-word detection of the voice-enabled device for a period of time.

4. The method of claim 1, wherein the media-playback device comprises the voice-enabled device.

5. The method of claim 1, wherein the voice-enabled device is separate from the media-playback device, wherein controlling the configuration of the voice-enabled device comprises transmitting a configuration signal from the media-playback device to the voice-enabled device.

6. The method of claim 1, wherein the media-playback device is a mobile device.

7. The method of claim 1, further comprising:
receiving an audio stream to be output by the media-playback device as at least part of the ambient sound; and
determining that the received audio stream includes the wake word,
wherein the controlling of the configuration of the voice-enabled device occurs in response to the determining that the audio stream includes the wake word.

8. The method of claim 7, further comprising:
sending the received audio stream to a wake word detector in the media-playback device to facilitate the determining that the received audio stream includes the wake word; and
sending by the media-playback device audio of the received audio stream for playout by a speaker.

9. The method of claim 7, wherein determining that the received audio stream includes the wake word comprises determining that the received audio stream includes sound that is the same as or similar to the wake word.

10. The method of claim 7, wherein receiving the audio stream comprises receiving the audio stream from a media-delivery system.

11. A media-playback device comprising:
at least one processor;
non-transitory data storage; and
program instructions stored in the non-transitory data storage and executable by the at least one processor to carry out operations including:
determining a playback delay, at the media-playback device, between reception of content and output of the content from a speaker,
comparing the playback delay to a threshold amount of time, and
controlling configuration of a voice-enabled device, wherein the controlling is based on the comparing and includes (i) if the playback delay is less than the threshold amount of time, then, based on the playback delay being less than the threshold amount of time, configuring a wake-word detector of the voice-enabled device to monitor for presence of a wake word in ambient sound and, upon detecting the wake word, to ignore the detected wake word, and (ii) if the playback delay is more than the threshold amount of time, then, based on the playback delay being more than the threshold amount of time, configuring the wake-word detector of the voice-enabled device to not monitor for presence of the wake word in the ambient sound.

12. The media-playback device of claim 11, wherein configuring the wake-word detector of the voice-enabled device to ignore the wake word detected in the ambient sound comprises configuring the wake-word detector of the voice-enabled device to not take action in response to detecting of the wake word.

13. The media-playback device of claim 11, wherein configuring the wake-word detector of the voice-enabled device to not monitor for presence of the wake word in the ambient sound comprises disabling wake-word detection of the voice-enabled device for a period of time.

14. The media-playback device of claim 11, wherein the media-playback device comprises the voice-enabled device.

15. The media-playback device of claim 11, wherein the voice-enabled device is separate from the media-playback device, wherein controlling the configuration of the voice-enabled device comprises transmitting a configuration signal from the media-playback device to the voice-enabled device.

16. The media-playback device of claim 11, wherein the operations additionally include:
receiving an audio stream to be output by the media-playback device as at least part of the ambient sound; and
determining that the received audio stream includes the wake word,
wherein the controlling of the configuration of the voice-enabled device occurs in response to the determining that the audio stream includes the wake word.

17. The media-playback device of claim 16, wherein determining that the received audio stream includes the wake word comprises determining that the received audio stream includes sound that is the same as or similar to the wake word.

18. At least one non-transitory computer-readable storage medium having stored thereon program instructions executable by at least one processor to carry out operations comprising:
determining a playback delay, at a media-playback device, between reception of content and output of the content from a speaker;
comparing the playback delay to a threshold amount of time; and
controlling configuration of a voice-enabled device, wherein the controlling is based on the comparing and includes (i) if the playback delay is less than the threshold amount of time, then, based on the playback delay being less than the threshold amount of time, configuring a wake-word detector of the voice-enabled device to monitor for presence of a wake word in ambient sound and, upon detecting the wake word, to ignore the detected wake word, and (ii) if the playback delay is more than the threshold amount of time, then, based on the playback delay being more than the threshold amount of time, configuring the wake-word detector of the voice-enabled device to not monitor for presence of the wake word in the ambient sound.

19. The at least one non-transitory computer-readable storage medium of claim 18, wherein configuring the wake-word detector of the voice-enabled device to ignore the wake word detected in the ambient sound comprises configuring the wake-word detector of the voice-enabled device to not take action in response to detecting of the wake word.

20. The at least one non-transitory computer-readable storage medium of claim 18, wherein configuring the wake-word detector of the voice-enabled device to not monitor for presence of the wake word in the ambient sound comprises disabling wake-word detection of the voice-enabled device for a period of time.

* * * * *